United States Patent
Lee et al.

(10) Patent No.: US 8,755,844 B2
(45) Date of Patent: Jun. 17, 2014

(54) MOBILE TERMINAL AND VIBRATION METHOD THEREOF

(75) Inventors: Gunmin Lee, Gwangju (KR); Heebae Song, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 224 days.

(21) Appl. No.: 13/372,024

(22) Filed: Feb. 13, 2012

(65) Prior Publication Data

US 2013/0044065 A1 Feb. 21, 2013

(30) Foreign Application Priority Data

Aug. 19, 2011 (KR) .......................... 10-2011-0083123

(51) Int. Cl.
*H04M 19/04* (2006.01)

(52) U.S. Cl.
USPC ........................................ 455/567; 455/556.1

(58) Field of Classification Search
USPC .............................................. 455/567, 556.1
See application file for complete search history.

(56) References Cited

U.S. PATENT DOCUMENTS

| | | | | |
|---|---|---|---|---|
| 8,031,059 B2 * | 10/2011 | Rollins et al. | ............. | 340/407.1 |
| 8,452,344 B2 * | 5/2013 | Eronen et al. | ................. | 455/567 |
| 8,600,354 B2 * | 12/2013 | Esaki | ............................ | 455/411 |
| 2005/0046551 A1 | 3/2005 | Cranfill et al. | | |
| 2009/0129623 A1 | 5/2009 | Weckström et al. | | |
| 2011/0064251 A1 | 3/2011 | Siotis | | |

FOREIGN PATENT DOCUMENTS

| | | |
|---|---|---|
| CA | 2917142 Y | 6/2007 |
| CN | 101208987 A | 6/2008 |
| CN | 101309477 A | 11/2008 |
| CN | 101552822 A | 10/2009 |
| EP | 2309708 A2 | 4/2011 |
| JP | 1719844 A | 1/2006 |

* cited by examiner

*Primary Examiner* — Simon Sing
(74) *Attorney, Agent, or Firm* — Birch, Stewart, Kolasch & Birch, LLP

(57) ABSTRACT

A mobile terminal including a main body; first and second speakers positioned in different regions of the main body; and a controller configured to detect a vibration command, to determine if audio contents are currently being reproduced on the mobile terminal when the vibration command is detected, and to apply a first signal having a frequency of a limited range to only one speaker among the first and second speakers so that vibration is generated by the only one speaker and to apply a second signal corresponding to the audio contents to the other speaker so that the audio contents are output by the other speaker, when the contents are currently being reproduced when the vibration command is detected.

20 Claims, 8 Drawing Sheets

MOBILE TERMINAL AND VIBRATION METHOD THEREOF

CROSS-REFERENCE TO RELATED APPLICATIONS

This application claims the benefit of Korean Patent Application No. 10-2011-0083123, filed on Aug. 19, 2011, which is hereby incorporated by reference for all purposes as if fully set forth herein.

BACKGROUND OF THE INVENTION

1. Field of the Invention

The present invention relates to a mobile terminal, and more particularly, to a mobile terminal including a speaker and a method of vibrating the same.

2. Background of the Invention

Terminals can be classified into a mobile terminal and a stationary terminal based on its mobility. Furthermore, terminals can be further classified into a handheld terminal and a vehicle mount terminal based on whether or not the terminal can be directly carried by a user.

As it becomes multifunctional, the mobile terminal can capture still or moving images, play music or video files, play games, receive broadcast and the like, so as to be implemented as an integrated multimedia player. Moreover, in order to support and enhance the function of the terminal, improvements of the terminal may be considered in the aspect of structure or software.

On the other hand, a speaker for outputting sound and a vibration motor for generating vibration may be commonly mounted in a mobile terminal. However, as the apparatuses mounted in the mobile terminal increase, limitations on space utilization become severe. In particular, an electronic element that has large volume and weight such as a vibration motor is an obstacle to making the mobile terminal small and light. Therefore, a unit that may generate vibration instead of the vibration motor is required.

SUMMARY OF THE INVENTION

Therefore, an aspect of the detailed description is to provide a mobile terminal capable of outputting sound and of generating vibration without mounting a vibration motor and a method of vibrating the same.

Another aspect of the detailed description is to provide a structure of a mobile terminal capable of transmitting weak vibration generated by a speaker to the main body.

To achieve these and other advantages and in accordance with the purpose of this specification, as embodied and broadly described herein, there is provided a mobile terminal, including a main body, first and second speakers positioned in different regions of the main body, and a controller for controlling signals applied to the first and second speakers in accordance with whether to reproduce audio contents during detection of a vibration command. The controller applies a first signal having a frequency of a limited range to the first speaker so that vibration is generated by the first speaker and applies a second signal corresponding to the audio contents to the second speaker so that the audio contents are output by the second speaker.

The controller applies the first signal to the first and second speakers so that vibration is generated by the first and second speakers when the audio contents are not reproduced during detection of the vibration command.

The mobile terminal further includes a case for forming an outer appearance of the main body and a display unit arranged on one surface of the case and configured to detect a touch input thereon. The controller detects the vibration command from the touch input on the display unit.

The controller selects one of the first and second speakers based on a touch point of the touch input and applies the first signal to a selected speaker. The controller controls an amplitude, application numbers of time, and application time of the first signal based on the vibration command.

The first signal has a frequency of 200 Hz to 300 Hz.

The mobile terminal further includes a case for forming the outer appearance of the main body and an accommodating unit formed in one surface of the case to accommodate the first speaker. The accommodating unit includes a protrusion formed to protrude from the case and to limit an accommodating space for accommodating the first speaker and a supporting unit formed at one end of the protrusion to support the first speaker to be adhered to the one surface.

The mobile terminal further includes a guide member formed to surround the accommodating unit to guide sound from the first speaker toward the other surface of the case. A path through which the sound passes is formed in the guide member. The path is extended from the accommodating unit and is curved to be connected to an external space of the main body through a through hole formed in the other surface.

There is provided a method of vibrating a mobile terminal having first and second speakers positioned in different regions of the main body. The method includes detecting a vibration command and controlling signals applied to the first and second speakers in accordance with whether to reproduce the audio contents when the vibration command is detected. The signals include a first signal having a frequency of a limited range and a second signal corresponding to the audio contents.

Controlling the signals includes applying the first signal to the first speaker so that vibration is generated by the first speaker and applying the second signal to the second speaker so that the audio contents are output by the second speaker when the audio contents are reproduced during the detection of the vibration command.

Controlling the signals includes applying the first signal to the first and second speakers so that vibration is generated by the first and second speakers when the audio contents are not reproduced during the detection of the vibration command.

In detecting the vibration command, the vibration command is detected from a touch input on a display unit arranged on one surface of the main body.

The method further includes selecting one of the first and second speakers based on a touch point of the touch input and applying the first signal to a selected speaker.

The method further includes controlling amplitude, application number of times, and application time of the first signal based on the vibration command.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
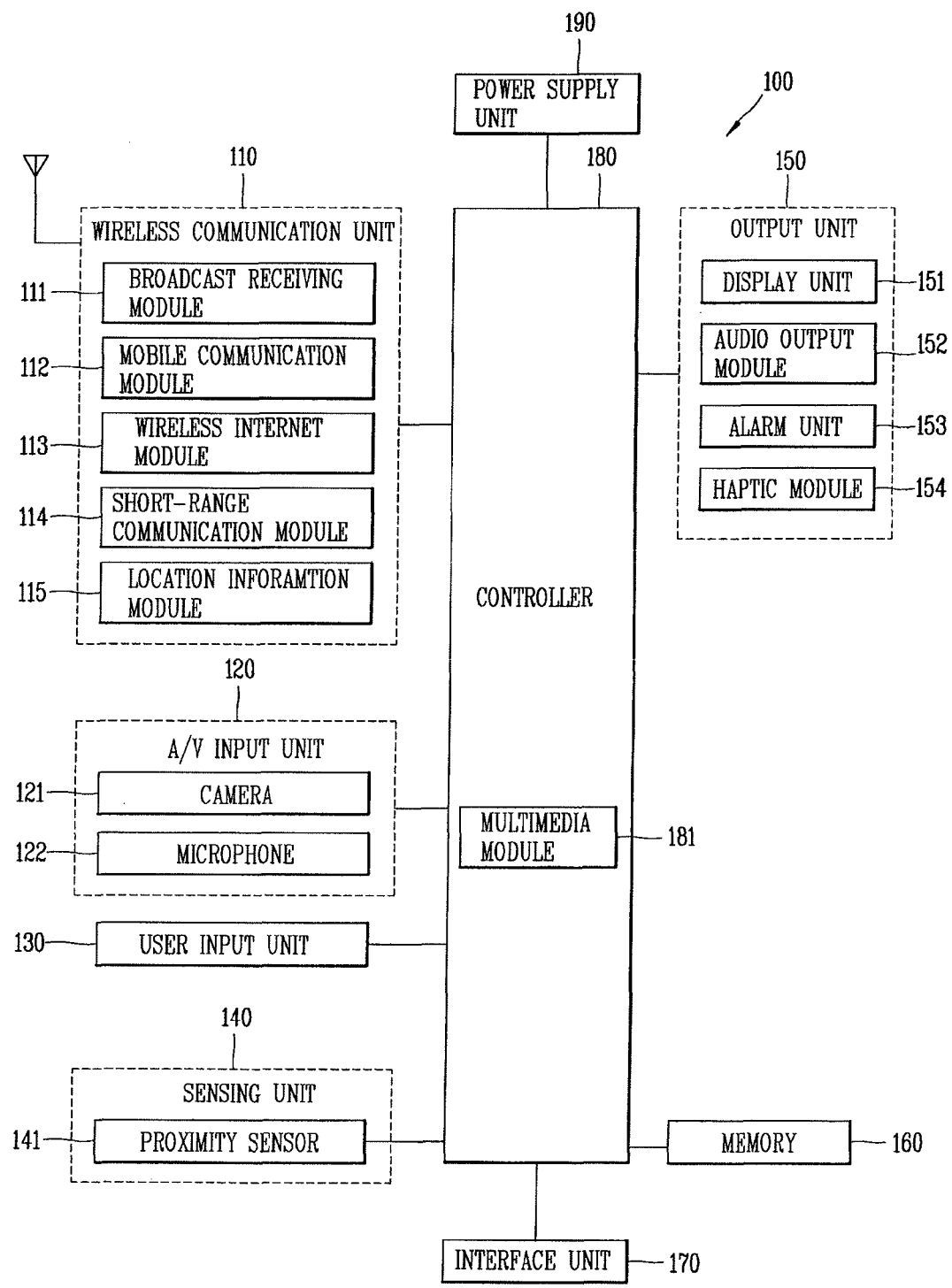
FIG. 1 is a block diagram illustrating a mobile terminal according to the present invention.

FIG. 1 is a block diagram illustrating a mobile terminal 100 according to one embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax™ (World Interoperability for Microwave Access), HSDPA (High Speed Downlink Packet Access), and the like.

The short-range communication module 114 is a module for supporting a short-range communication. Here, it may be used a short-range communication technology including Bluetooth™, Radio Frequency IDentification (RFID), Infrared Data Association (IrDA), Ultra WideBand (UWB), ZigBee™, and the like.

The location information module 115 is a module for checking or acquiring a location of the mobile terminal, and there is a global positioning system (GPS) module as a representative example.

Referring to FIG. 1, the AV (audio/video) input unit 120 receives an audio or video signal, and the AV (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like. The sensing unit 140 generates a sensing signal for controlling the operation of the mobile terminal 100.

For example, when the mobile terminal 100 is a slide phone type, The sensing unit 140 may sense an opened or closed status of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor for sensing a touch operation to the display unit 151.

The touch sensor may be implemented as a touch film, a touch sheet, a touch pad, and the like. The touch sensor may be configured to convert changes of a pressure applied to or a capacitance occurring from, a specific part of the display unit 151 into electric input signals. Also, the touch sensor may be configured to sense not only a touched position and a touched area, but also a touch pressure.

When the display unit 151 and the touch sensor have a layered structure therebetween, the display unit 151 may be used as an input device rather than or in addition to, an output device. The display unit 151 may be referred to as a "touch screen".

When there is a touch input through the touch screen, the corresponding signals are sent to a touch controller. The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized as a proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 153 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way.

For example, an output window and an input window may be displayed on the upper portion and lower portion of the display unit, respectively. The output window and the input window may be regions allocated to output or input information, respectively. A soft key on which numerals for inputting phone numbers or the like are displayed is displayed on the input window.

When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path of the finger may be visually displayed on the display unit 151. It may be useful to edit an image displayed on the display unit 151.

One function of the mobile terminal 100 may be executed when the display unit 151 and the touch pad are touched together within a predetermined period of time. Touching together when the user clamps a terminal body of the mobile terminal 100 using the thumb and forefinger. One of the functions executed in the mobile terminal 100 may involve activation or de-activation for the display unit 151 or the touch pad.

Figure 2A:
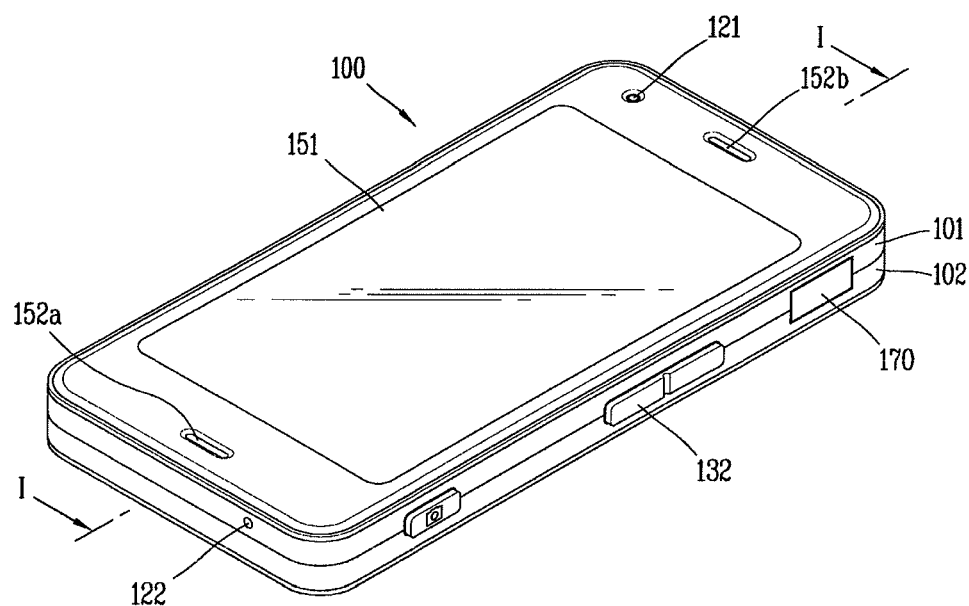
FIGS. 2A and 2B are perspective views illustrating the outer appearance of the mobile terminal according to the present invention.
Figure 2B:
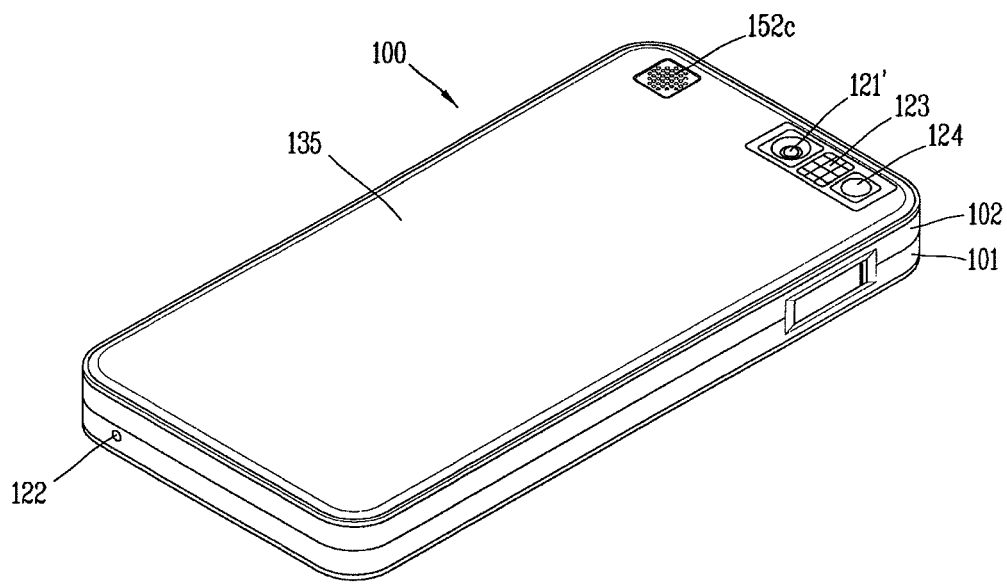

FIGS. 2A and 2B are perspective views illustrating the external appearance of a mobile terminal 100 according to on embodiment of the present invention. FIG. 2A illustrates a front surface and one lateral surface of the mobile terminal 100, and FIG. 2B illustrates a rear surface and the other lateral surface of the mobile terminal 100.

Referring to FIG. 2A, the mobile terminal 100 is provided with a bar-type terminal body. However, the present invention is not only limited to this type of terminal, but also applicable to various structures of terminals such as slide-type, folder-type, swivel-type, swing-type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, speakers 152a, 152b, a camera 121, a user input unit 130 (refer to FIG. 1), a microphone 122, an interface unit 170, and the like may be arranged on the terminal body, mainly on the front case 101.

The display unit 151 occupies a portion of the front case 101. The speakers 152a, 152b and the camera 121 are disposed on a region adjacent to one of both ends of the display unit 151, and the first manipulation unit 131 and the microphone 122 are disposed on a region adjacent to the other end thereof. The second manipulation unit 132 and the interface 170, and the like, may be disposed on a lateral surface of the front case 101 and the rear case 102.

The user input unit 130 is manipulated to receive a command for controlling the operation of the portable terminal 100. The user input unit 130 may include a first manipulation unit 131 and a second manipulation unit 132.

A first 131 or a second 132 manipulating unit may receive various commands. The first manipulation unit 131 may be used to receive a command, such as start, end, scroll, or the like. The second manipulation unit 132 may be used to receive a command, such as controlling a volume level being output from the speakers 152a, 152b, or switching it into a touch recognition mode of the display unit 151.

Referring to FIG. 2B, a camera 121' may be additionally mounted on a rear surface of the terminal body, namely, the rear case 102. The camera 121' has an image capturing direction, which is substantially opposite to the direction of the camera 121 (refer to FIG. 2A), and may have different pixels from those of the camera 121.

For example, it is preferable that the camera 121 has a relatively small number of pixels that is not enough to cause a difficulty when the user captures his or her own face and sends it to the other party during a video call or the like. The camera 121' has a relatively large number of pixels since the user often captures a general object that is not sent immediately.

Meanwhile, the cameras 121, 121' may be provided in the terminal body in a rotatable and pop-upable manner.

Furthermore, a flash 123 and a minor 124 may be additionally disposed adjacent to the camera 121'. The flash 123 illuminates light toward an object when capturing the object with the camera 121'. The mirror 124 allows the user to look at his or her own reflected face when capturing himself or herself (in a self-portrait mode) by using the camera 121'.

Furthermore, another speaker 152c may be additionally disposed on a rear surface of the terminal body. The another speaker 152c together with the speakers 152a, 152b (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similar to the display unit 151 (refer to FIG. 2A). Furthermore, a rear side display unit for visual information may be also additionally mounted on the touch pad 135. In this case, information displayed on both surfaces of the front side display unit 151 and the rear side display unit may be controlled by the touch pad 135.

The touch pad 135 may be operated in conjunction with the display unit 151. The touch pad 135 may be disposed in parallel to and at a rear side of the display unit 151. The touch pad 135 may have the same size as or a smaller size than the display unit 151.

In general, a speaker vibrates a vibrating plate to convert an electrical signal into sound of an audio frequency band. When a signal having a frequency of a limited range is applied to the speaker, the vibration generated by the vibrating plate may be sensed by a user. Therefore, sound may be output and vibration may be generated by the speaker in accordance with the signal applied to the speaker.

Hereinafter, a mechanism of a mobile terminal 100 according to an embodiment of the present invention controlling the output of sound and the generation of vibration using a plurality of speakers will be described. According to the embodiment, the mobile terminal 100 may include first and second speakers 152a and 152b positioned in different regions of the main body.

Figure 3:
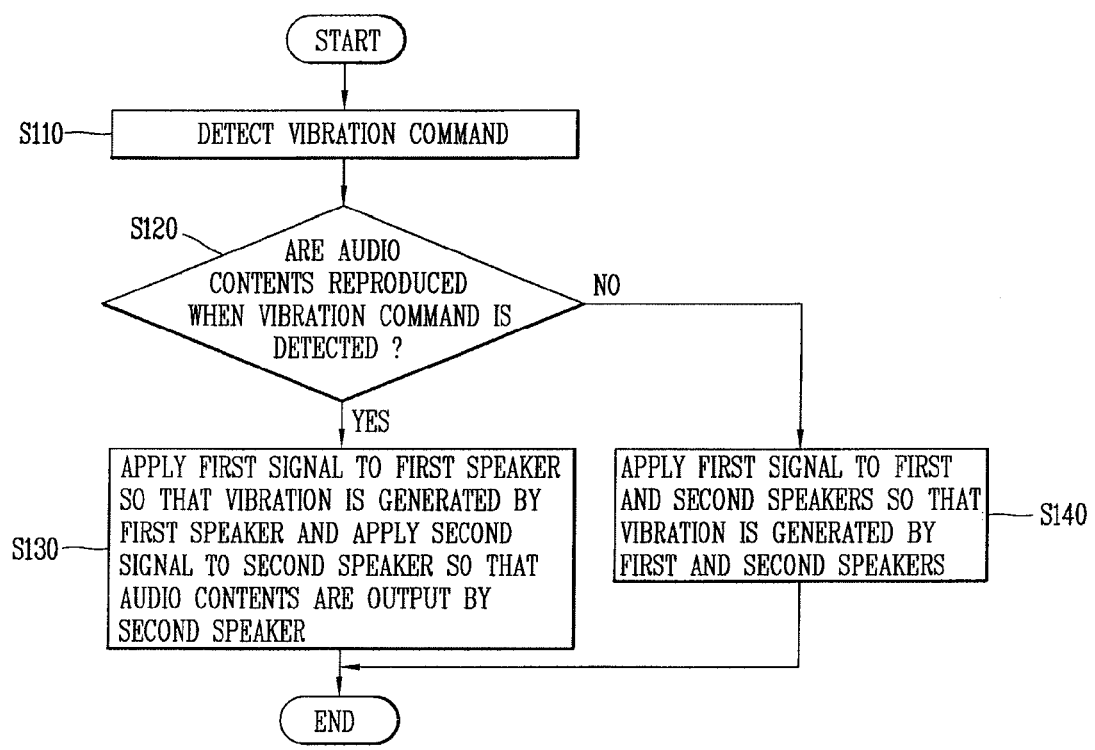
FIG. 3 is a flowchart describing a method of vibrating a mobile terminal according to an embodiment of the present invention.

FIG. 3 is a flowchart describing a method of vibrating the mobile terminal 100 according to an embodiment of the present invention. Referring to FIG. 3, the vibration method includes a step S110 of detecting a vibration command. When the vibration command is received from the outside or is generated inside in a specific situation, the vibration command may be detected by the controller 180. For example, the vibration command may be detected by a touch input on a display unit or an input through a user input unit (for example, a hard key). In addition, the vibration command may be detected when a telephone call and a text message are received.

Then, a step S120 of determining whether to reproduce audio contents when the vibration command is detected is performed. The audio contents may be reproduced before the vibration command is detected or may be reproduced in response to the vibration command.

In accordance with the result of determination, that is, in accordance with whether audio contents are being reproduced when the vibration command is detected, the signals are selectively applied to the first and second speakers. The signals applied to the first and second speakers may include a first signal having a frequency of a limited range, for example, a frequency of 200 Hz to 300 Hz and a second signal corresponding to the audio contents. That is, the first signal is a signal for generating vibration and the second signal is a signal for outputting sound. The amplitude, the application numbers of time, and the application time of the first signal may be controlled based on the vibration command. Therefore, vibration of various patterns may be generated by the speaker to which the first signal is applied.

When the audio contents are reproduced during the detection of the vibration command (yes in S120), a step (S130) of applying the first signal to the first speaker so that vibration is generated by the first speaker and of applying the second signal to the second speaker so that the audio contents are output by the second speaker may be performed.

On the other hand, when the audio contents are not reproduced during the detection of the vibration command (no in S120), a step (S140) of applying the first signal to both of the first and second speakers so that vibration is generated by the first and second speakers may be performed.

As described above, the signals applied to the plurality of speakers are controlled in accordance with whether to reproduce the audio contents during the detection of the vibration command so that vibration of various patterns may be generated together with the output of sound by the plurality of speakers. In particular, when sound may not be output, vibration is generated using all of the speakers included in the mobile terminal so that stronger vibration can be felt by a user.

In addition, since vibration may be generated without using an expensive motor having large volume and weight, the mobile terminal can be made smaller and lighter and the production cost may be reduced.

Figure 4:
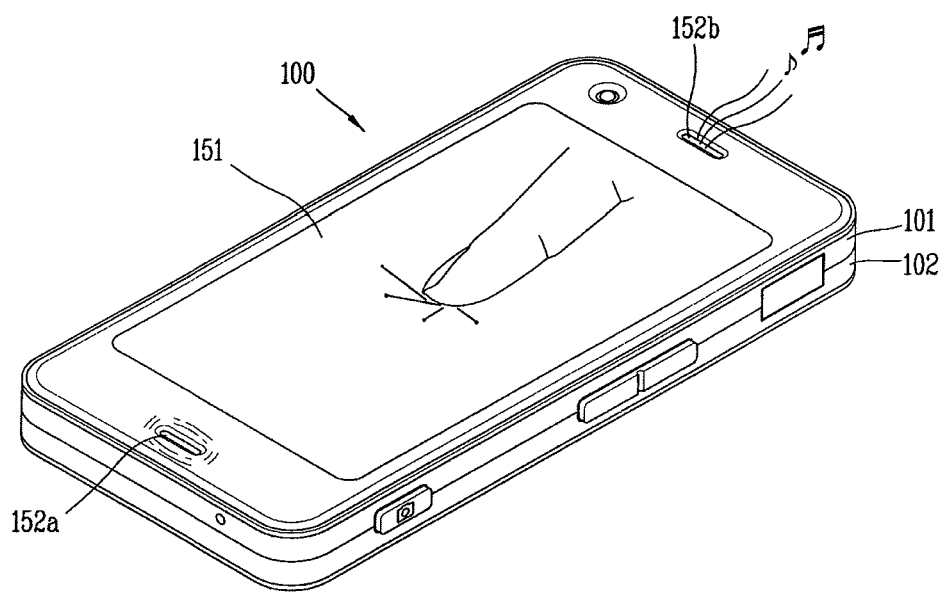
FIGS. 4 to 6 are conceptual views illustrating examples of operating a mobile terminal according to the vibration method illustrated in FIG. 3.
Figure 5:
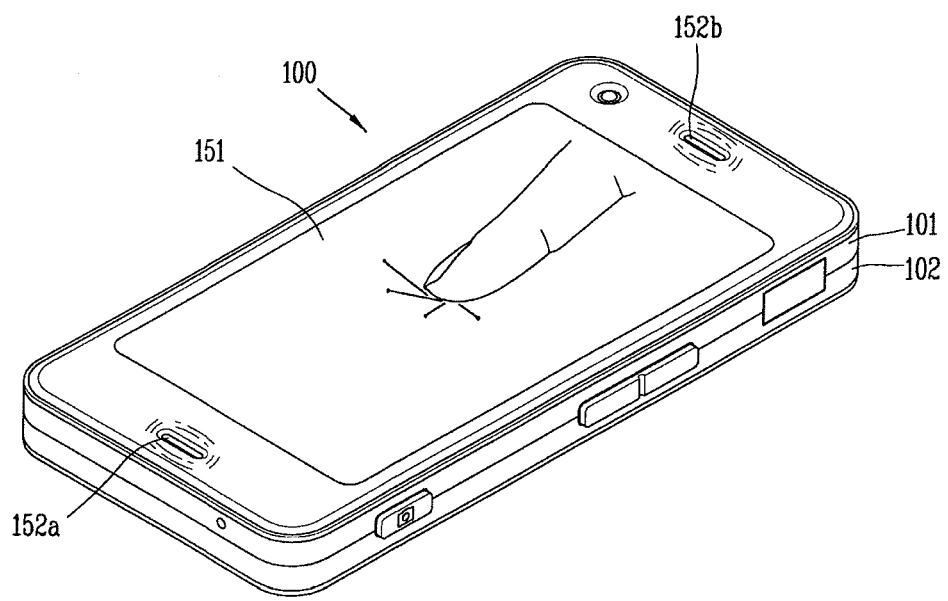
Figure 6:
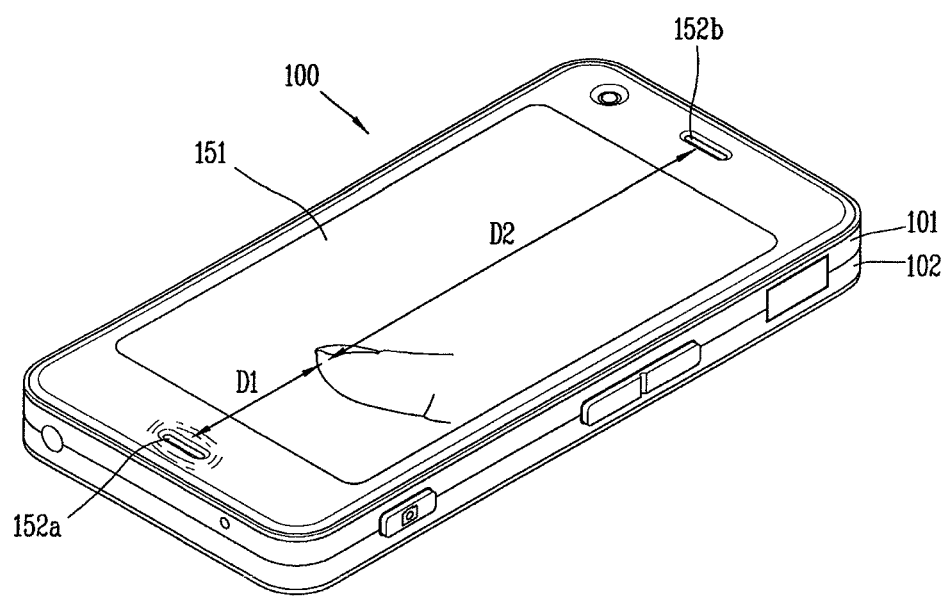

Next, FIGS. 4 to 6 are conceptual views illustrating examples of operating the mobile terminal 100 according to the vibration method illustrated in FIG. 3. Here, the mobile terminal 100 for outputting vibration through at least one of the first and second speakers 152a and 152b in accordance with the vibration command detected when a touch on the display unit 151 is input is illustrated, which means that haptic effect may be generated by speakers during the touch input.

Referring to FIG. 4, when the audio contents are reproduced during the detection of the vibration command, that is, during the touch input, the controller may apply the first signal to the first speaker 152a and may apply the second signal to the second speaker 152b. As described above, the first and second signals correspond to the signal having the frequency in the limited range of 200 Hz to 300 Hz and the signal corresponding to the audio contents.

The vibration is generated by the first speaker 152a and the audio contents may be output by the second speaker 152b by the above-described control operation. As a result, the user may feel the vibration in response to the touch input during the touch input while hearing the output sound of the audio contents that are being reproduced.

Referring to FIG. 5, when the audio contents are not reproduced during the detection of the vibration command, the controller may apply the first signal to all of the first and second speakers 152a and 152b. Therefore, the vibration of the first and second speakers 152a and 152b may be generated. As a result, in a state where the audio contents are not reproduced, for example, in a mute mode, the user may feel stronger vibration in response to the touch input.

Referring to FIG. 6, the controller 180 can analyze the touch point of the touch input on the display unit 151. The controller 180 may select one of the first and second speakers 152a and 152b based on the touch point and may apply the first signal to the selected speaker so that the vibration may be generated by the selected speaker.

In more detail, the controller 180 may calculate the distances between the speakers 152a and 152b and the touch point, for example, the first distance D1 between the first speaker 152a and the touch point and the second distance D2 between the second speaker 152b and the touch point. The controller 180 may apply the first signal to the speaker positioned to be closer to the touch point in accordance with the comparison result of the first and second distances D1 and D2. As illustrated in FIG. 6, when the first distance D1 is smaller than the second distance D2, the controller 180 may apply the first signal to the first speaker 152a to generate the vibration.

On the other hand, the controller 180 may not apply any signal to the second speaker 152b or may apply the second signal to the second speaker 152b in accordance with a setting mode. For example, the controller 180 may apply the first signal to the first speaker 152a close to the touch point in the mute mode and may not apply any signal to the second speaker 152b remote from the touch point. In addition, the controller may apply the first signal to the first speaker 152a close to the touch point in an audio contents reproduction mode and may apply the second signal for reproducing the audio contents to the second speaker 152b remote from the touch point.

As described above, the vibration is generated by the speaker positioned to be closer to the touch point so that the attenuation amount of the vibration transmitted to the finger of the user. Therefore, the user may feel the vibration better around the touch point.

Hereinafter, a structure, in which the vibration is well transmitted to the main body when the signal (the first signal) having the frequency in the limited range is applied to at least one of the plurality of speakers so that the vibration is generated according to the present invention, will be described.

Figure 7:
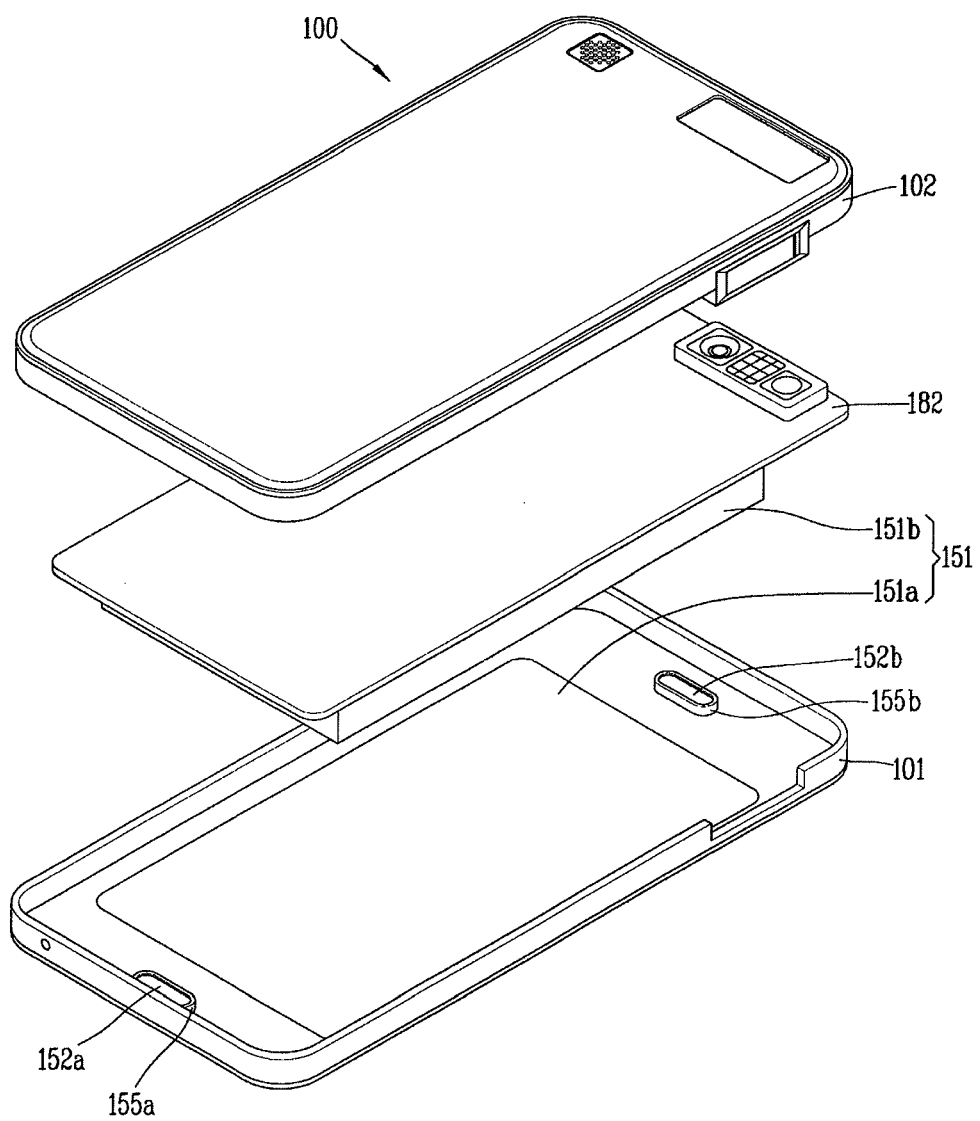
FIG. 7 is an exploded view of the mobile terminal illustrated in FIG. 2A.
Figure 8:
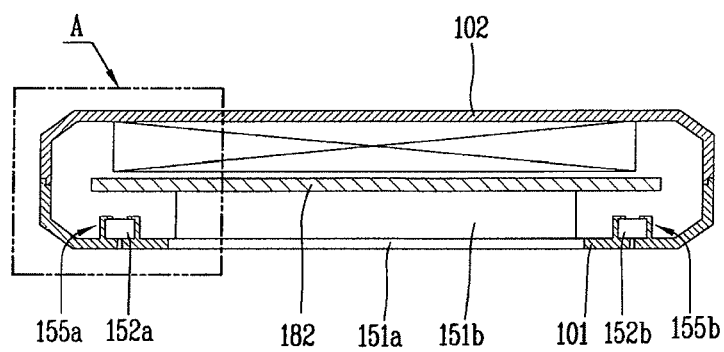
FIG. 8 is a sectional view taken along the line I-I illustrated in FIG. 2A.

FIG. 7 is an exploded view of the mobile terminal 100 illustrated in FIG. 2A. FIG. 8 is a sectional view taken along the line I-I illustrated in FIG. 2A. Referring to FIGS. 7 and 8, the mobile terminal 100 may include a case that constitutes the outer appearance of the main body, for example, a front case 101 and a rear case 102.

A circuit board 182 may be mounted in the main body. The circuit board 182 may be constituted as an example of the controller (180, refer to FIG. 1) for controlling the operation of the mobile terminal 100. Therefore, various electronic elements may be mounted in the circuit board 182. In addition, the circuit board 182 may be constituted of a plurality of sub circuit boards and the function of the controller 180 may be performed by the combination of the sub circuit boards.

The display unit 151 may include a window 151a and a display module 151b. The window 151a is mounted in the front case 101 and the display module 151b may be mounted in the circuit board 182.

As illustrated in FIGS. 7 and 8, first and second accommodating units 155a and 155b may be formed in the front case 101 so as to accommodate the first and second speakers 152a and 152b. The first and second accommodating units 155a and 155b may be formed so that the first and second speakers 152a and 152b are adhered to the front case 101.

As described above, the first and second speakers 152a and 152b are not mounted in the circuit board 182 but are adhered to the front case 101 so that the vibration may be directly transmitted to the main body when the vibration is generated by the first and second speakers 152a and 152b.

In addition, the first and second accommodating units 155a and 155b may be formed in the rear case 102. Therefore, the first and second speakers 152a and 152b may be adhered to the rear case 102 by the first and second accommodating units 155a and 155b.

As illustrated in FIGS. 7 and 8, the first and second accommodating units 155a and 155b are arranged on both sides of the window 251a and may have similar structures. Therefore, the first accommodating unit 155a will be described in detail with reference to FIG. 9. However, the same technical characteristic as the first accommodating unit 155a may be applied to the second accommodating unit 155b.

Figure 9:
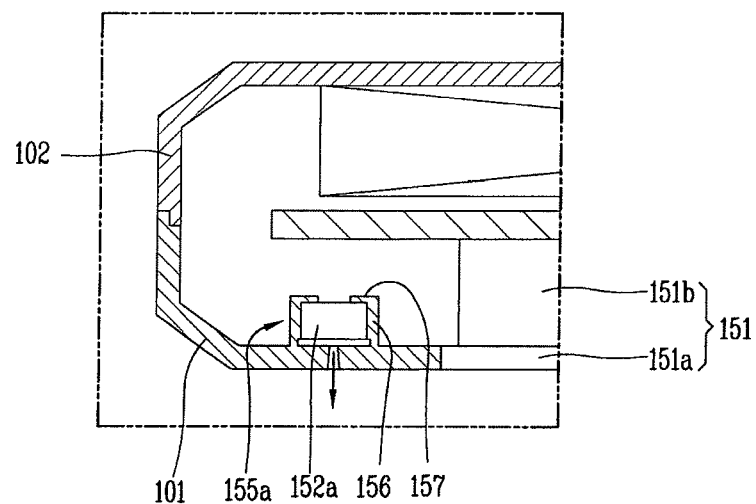
FIG. 9 is an enlarged view of the part A illustrated in FIG. 8.

FIG. 9 is an enlarged view of the part A illustrated in FIG. 8. Referring to FIG. 9, the first accommodating unit 155a is formed in one surface of the front case 101, is positioned around the window 151a, and includes a protrusion 156 and a supporting unit 157.

The protrusion 156 may be formed to protrude from the front case 101 and to limit an accommodating space for accommodating the first speaker 152a. For example, the protrusion 156 protrudes from the internal surface of the front case 101 in the form of a circle to form a closed loop so that the accommodating space may be provided.

The supporting unit 157 is formed at one end of the protrusion and is formed to cover at least a part of the speaker 152a to support the first speaker 152a so as to be adhered to one surface of the front case 101, that is, the bottom surface of the first accommodating unit 155a.

In order to increase the degree of adhesion between the bottom surface of the first accommodating unit 155a and the first speaker 152a, the protrusion 156 and the supporting unit 157 may be integrally formed of the same material. In addition, although not shown, a fixing rib may be formed between the supporting unit 157 and the first speaker 152.

A through hole is formed in the bottom surface of the first accommodating unit 155a so that sound from the first speaker 152a may be discharged through the through hole.

Figure 10:
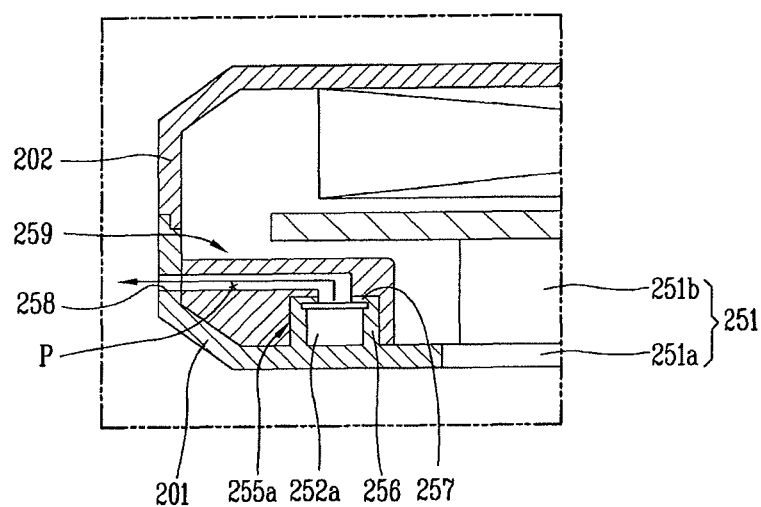
FIG. 10 is an enlarged view illustrating a modification of the part A illustrated in FIG. 9.

FIG. 10 is an enlarged view illustrating a modification of the part A illustrated in FIG. 9. Hereinafter, redundant description will be omitted. Referring to FIG. 10, a first accommodating unit 255a and a guide member 259 may be formed in one surface (for example, the front surface of the main body) of the front case 201.

As illustrated in FIG. 9, the first accommodating unit 255a may include a protrusion 256 for limiting the accommodating space and a supporting unit 267 for supporting a first speaker 252a in the accommodating space.

The guide member 259 may be formed to be combined with the first accommodating unit 255a and to surround the first accommodating unit 155a. the guide member 259 may guide the sound from the first speaker 252a toward the other surface (for example, the side surface of the main body) the front case 201.

In more detail, a path P through which the sound from the first speaker 252a passes through may be formed in the guide member 259. The path P is extended from the first accommodating unit 255a and may be curved to be connected to the external space of the main body through a through hole 258 formed on the other surface of the front case 201.

When the first signal, that is, the signal having the frequency in the limited range of 200 Hz to 300 Hz is applied to the first speaker 252a by the control operation of the controller so that the vibration is generated, the frequency signal sound corresponding to the first signal may be output. Since the frequency signal sound is minute, however, may be offensive to the ear, the frequency signal sound is preferably removed.

As described above, according to the embodiment of the present invention, the frequency signal sound output from the first speaker 252a may be attenuated while passing through the curved path P of the guide member 259. Therefore, the user may not be hindered by the frequency signal sound generated when the vibration is generated.

According to an embodiment disclosed in the present specification, the above-described method may be realized by a code that may be read by a processor in media where programs are recorded. The media that may be read by the processor include a read only memory (ROM), a random access memory (RAM), a CD-ROM, a magnetic tape, a floppy disk, and an optical data storage apparatus. Realization in the form of a carrier wave (for example, transmission through the Internet) is also included.

In the mobile terminal disclosed in the present invention, the structures and methods of the above-described embodiments are not limitedly applied but all or parts of the embodiments may be selectively combined with each other so that various modifications may be performed.

What is claimed is:

1. A mobile terminal, comprising:
   a main body;
   first and second speakers positioned in different regions of the main body; and
   a controller configured to detect a vibration command, to determine if audio contents are currently being reproduced on the mobile terminal when the vibration command is detected, and to apply a first signal having a frequency of a limited range to only one speaker among the first and second speakers so that vibration is generated by said only one speaker and to apply a second signal corresponding to the audio contents to the other speaker so that the audio contents are output by the other speaker, when the contents are currently being reproduced when the vibration command is detected.

2. The mobile terminal as claimed in claim 1, wherein the controller is further configured to apply the first signal to both of the first and second speakers so that vibration is generated by the first and second speakers, when the contents are not currently being reproduced when the vibration command is detected.

3. The mobile terminal as claimed in claim 1, further comprising:
   a case forming an outer appearance of the main body; and
   a display unit arranged on one surface of the case and configured to detect a touch input thereon,
   wherein the controller is further configured to detect the vibration command from the touch input on the display unit.

4. The mobile terminal as claimed in claim 3, wherein the controller is further configured to variably select said only one speaker as being one of the first and second speakers that is closest to a position of the touch input.

5. The mobile terminal as claimed in claim 1, wherein the controller is further configured to control an amplitude, application numbers of time, and application time of the first signal based on the vibration command.

6. The mobile terminal as claimed in claim 1, wherein the first signal has a frequency of 200 Hz to 300 Hz.

7. The mobile terminal as claimed in claim 1, further comprising:
   a case forming an outer appearance of the main body; and
   an accommodating unit formed in one surface of the case to accommodate the first speaker.

8. The mobile terminal as claimed in claim 7, wherein the accommodating unit comprises:
   a protrusion protruding from the case and limiting an accommodating space for accommodating the first speaker; and
   a supporting unit formed at one end of the protrusion to support the first speaker to be adhered to the one surface.

9. The mobile terminal as claimed in claim 7, further comprising:
   a guide member formed to surround the accommodating unit to guide sound from the first speaker toward the other surface of the case.

10. The mobile terminal as claimed in claim 9, wherein the guide member includes a path through which the sound passes, and
    wherein the path extends from the accommodating unit and is curved to be connected to an external space of the main body through a through hole formed in the other surface.

11. A method of controlling a mobile terminal, the method comprising:
    detecting, via a controller of the mobile terminal, a vibration command;
    determining, via the controller, if audio contents are currently being reproduced on the mobile terminal when the vibration command is detected; and
    applying a first signal having a frequency of a limited range to only one speaker among first and second speakers included on the mobile terminal so that vibration is generated by said only one speaker and applying a second signal corresponding to the audio contents to the other speaker so that the audio contents are output by the other speaker, when the contents are currently being reproduced when the vibration command is detected.

12. The method as claimed in claim 11, wherein the applying step applies the first signal to both of the first and second speakers so that vibration is generated by the first and second speakers, when the contents are not currently being reproduced when the vibration command is detected.

13. The method as claimed in claim 11, wherein the mobile terminal includes a case forming an outer appearance of the main body, and a display unit arranged on one surface of the case and configured to detect a touch input thereon, and
wherein the detecting step detects the vibration command from the touch input on the display unit.

14. The method as claimed in claim 13, further comprising:
variably selecting said only one speaker as being one of the first and second speakers that is closest to a position of the touch input.

15. The method as claimed in claim 11, further comprising:
controlling an amplitude, application numbers of time, and application time of the first signal based on the vibration command.

16. The method as claimed in claim 11, wherein the first signal has a frequency of 200 Hz to 300 Hz.

17. The method as claimed in claim 11, wherein the mobile terminal includes a case forming an outer appearance of the main body, and an accommodating unit formed in one surface of the case to accommodate the first speaker.

18. The method as claimed in claim 17, wherein the accommodating unit comprises:
a protrusion protruding from the case and limiting an accommodating space for accommodating the first speaker; and
a supporting unit formed at one end of the protrusion to support the first speaker to be adhered to the one surface.

19. The method as claimed in claim 17, wherein the mobile terminal further includes a guide member formed to surround the accommodating unit to guide sound from the first speaker toward the other surface of the case.

20. The method as claimed in claim 19, wherein the guide member includes a path through which the sound passes, and
wherein the path extends from the accommodating unit and is curved to be connected to an external space of the main body through a through hole formed in the other surface.

* * * * *